United States Patent [19]
Tiggelbeck et al.

[11] Patent Number: 5,068,029
[45] Date of Patent: Nov. 26, 1991

[54] TWO-CHAMBER FLUID/SOLIDS TREATMENT VESSEL

[75] Inventors: Donald D. Tiggelbeck, Pittsburgh, Pa.; Samuel K. Patton, Heber Springs, Ak.

[73] Assignee: Tigg Corporation, Pittsburgh, Pa.

[21] Appl. No.: 481,320

[22] Filed: Feb. 20, 1990

[51] Int. Cl.[5] .............................................. B01D 24/14
[52] U.S. Cl. .................................... 210/284; 210/288
[58] Field of Search ................ 210/189, 284, 287, 288

[56] References Cited
U.S. PATENT DOCUMENTS

| | | | |
|---|---|---|---|
| 1,789,961 | 1/1931 | Astrom | 210/288 |
| 3,298,950 | 1/1967 | Mindler | 210/189 |
| 4,383,920 | 5/1983 | Muller et al. | 210/284 |
| 4,818,398 | 4/1989 | Lott | 210/287 |

Primary Examiner—Ivars Cintins
Attorney, Agent, or Firm—Harry B. Keck

[57] ABSTRACT

A two-chamber vessel provides for separate treatment of a fluid stream with particulate solids. Separate means are provided to introduce and remove particulate solids into each chamber. Separate means are provided to introduce and recover fluids from each chamber. The chambers may be operated in series or in parallel or for unrelated treatments. In a preferred embodiment, all of the inlet conduits for both chambers are presented at one end of the vessel.

16 Claims, 3 Drawing Sheets

| | VALVE POSITION | | | | | | |
|---|---|---|---|---|---|---|---|
| | A | B | C | D | E | F | G |
| PARALLEL | O | O | O | O | C | C | * |
| SERIES TOP/BOTTOM | C | O | C | O | O | C | C |
| SERIES BOTTOM/TOP | O | C | O | C | C | O | C |
O = VALVE OPEN
C = VALVE CLOSED
* = VALVE OPEN OR CLOSED
Fig. 7
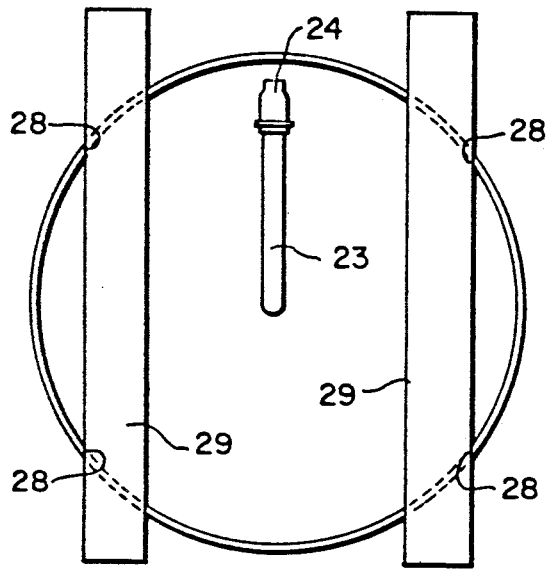
Fig. 8
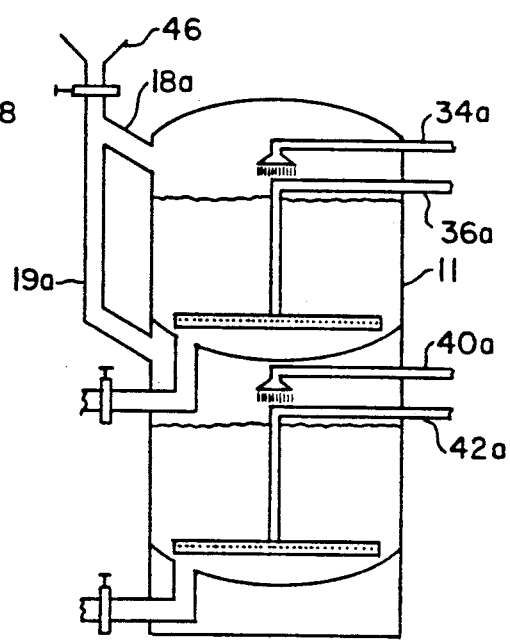
Fig. 9

5,068,029

TWO-CHAMBER FLUID/SOLIDS TREATMENT VESSEL

BACKGROUND OF THE INVENTION

1. Field of the Invention

The invention concerns a two-chamber vessel useful as a fluid/solids treatment apparatus and more particularly to a single vessel having two chambers in which a fluid stream may be treated with particulate solids in parallel flow, i.e., through each of the two chambers concurrently; in series flow, i.e., through a first chamber and thereafter through a second chamber or through a second chamber and thereafter through a first chamber; or in alternating flow, i.e., where all of the fluid passes through a first chamber while solids in the second chamber are being regenerated or replaced. Distinctly different treating solids may be provided in the chamber compared to the other chamber.

2. Description of the Prior Art

Treatment of fluids (gases or liquids) with particulate solids is a process used in many technologies. Of particular interest is treatment of a fluid with particulate activated carbon for the purpose of removing selected ingredients, usually contaminants or pollutants, from the fluid.

Activated carbon is employed in particulate form, usually screened to typically plus 1/32 inch mesh, minus ⅛ inch mesh. A container is provided with an inventory of particulate activated carbon and the fluid (gas or liquid) is introduced into the container at one end and passes through the inventory of activated carbon particles which selectively adsorb the adsorbable ingredients of the fluid. The unadsorbed fluid is withdrawn from the container.

It is not uncommon to use activated carbon treatment containers in parallel and it is not uncommon to use activated carbon containers in series. Parallel installations are employed where there is a large volume of fluid which requires a predetermined residence time in contact with the activated carbon, a residence time which cannot be achieved in a single container. Serial arrangements are employed where a preliminary reduction in the contaminant content of the fluid undergoing treatment is achieved in the first container and a further reduction in contaminant content is achieved in the second container. A particular advantage of the serial or series arrangement is that the more saturated adsorbent is maintained in the upstream container and the less saturated adsorbent is in the downstream container, achieving countercurrent flow efficiency.

Another serial arrangement provides different treating solids in each chamber. For example, one chamber may contain sand and function as a filter; one chamber may contain ion-exchange resins for selective removal of anions or cations; or one chamber may contain activated carbon for selective removal of organic ingredients. It is commonplace to have more than two containers and to regenerate activated carbon which approaches its adsorption capacity. Regeneration sometimes occurs in situ. Ion exchange resins normally are regenerated in situ; sand as a filter may be backwashed in situ. It is commonplace to withdraw spent activated carbon from a container and replace fresh or off-site regenerated activated carbon. Spent activated carbon may be regenerated or discarded.

There are many applications for activated carbon treatment of fluids in remote locations, e.g., chemical spills and chemical leaks, particularly gas leaks. In responding to such remote location applications, the operator frequently does not have fore knowledge of the volume of fluid to be treated or the concentration of the contaminant. In permanent installations, there may be a need for continuous fluid treatment requiring at least two separate containers to permit regeneration or replacement of the contents of one container while another container is serving the requirements of the installation.

DESCRIPTION OF THE INVENTION

According to the present invention, two separate and distinct fluid/solids treatment chambers are provided in a single vessel which has a side wall, a top wall, a bottom wall and an intermediate wall which joins the inner surface of the side wall to divide the vessel into an upper chamber and a lower chamber. Solids loading conduit means are provided for each chamber for introducing fresh or regenerated activated carbon. Solids withdrawal conduit means are provided for withdrawing spent adsorbent from each of the chambers. Fluid inlet conduit means are provided for introducing fluid to be treated into the first chamber and fluid inlet conduit means are provided for introducing fluid to be treated into the second chamber. Fluid withdrawal conduit means are provided for withdrawing fluid from the first chamber and fluid withdrawal conduit means are provided for withdrawing fluid from the second chamber. These fluid withdrawal means may be employed to introduce fluids during backwashing treatment of a container. Appropriate valved connections are provided to permit parallel flow through each of the two chambers; or to permit serial flow through the first chamber and thereafter through the second chamber; or through the second chamber and thereafter through the first chamber; or to permit flow of fluid through a single one or the other of the two chambers.

Each chamber is provided with a manhole to accommodate internal maintenance. A manhole may be used to remove particulate solids from a chamber or to introduce particulate solids into a chamber.

In a preferred embodiment, the fluid inlet and withdrawal conduit means extend through the top wall of the vessel to facilitate quick connections, reconnections and maintenance. In a preferred embodiment of the invention, each of the two chambers is provided with a fluid collector or distributor adjacent to the bottom of the chamber for uniformly collecting or distributing fluid within each chamber.

Accordingly it is the principal object of this invention to provide a vessel containing two separate chambers, one above the other for treating fluids with particulate solids in both chambers at the same time; or sequentially in one chamber and thereafter in the other chamber; or alternately in one chamber only and thereafter in the other chamber only.

A further object of the invention is to provide a single vessel which can be quickly and effectively employed in treating fluids in a wide variety of specific installations, minimizing space requirements and yet offering operational flexibility and economic benefits including:

(1) lower vessel and piping costs than two separate vessels;

(2) ability to treat higher fluid flow rates than a single vessel of equal external dimensions;

(3) ability to obtain countercurrent adsorbent efficiency versus a single vessel;

(4) ability to employ two separate types of adsorbents, such as activated carbon adsorption followed by ion exchange, in a vessel of given dimensions; and (5) ability to employ sand or similar particulate filtration followed by adsorption.

DESCRIPTION OF DRAWINGS

FIG. 7 is a table showing valve positions of valves of FIG. 6 for different operating modes.

FIG. 8 is a bottom view of the vessel of FIG. 1.

FIG. 9 is a schematic view of a vessel according to an alternative embodiment of the invention which is not the preferred embodiment.

DESCRIPTION OF THE PREFERRED EMBODIMENTS

Figure 2:
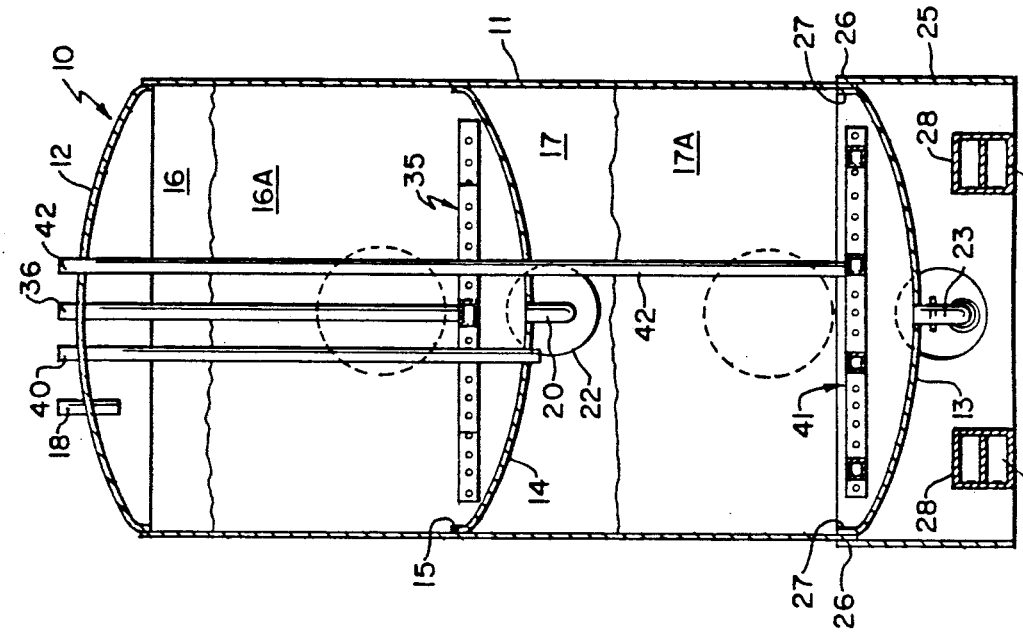
FIG. 2 is a cross-section view through the vessel of FIG. 1 taken along the line 2—2.

A cylindrical vessel 10 has a cylindrical side wall 11, a top wall 12, a bottom wall 13 and an intermediate wall 14 which is secured along its rim 15 to the inner surface of the side wall 11. The intermediate wall 14 separates the vessel 10 into a top chamber 16 and a bottom chamber 17. Preferably the walls 12, 13, 14 are dish-shaped as shown.

The side wall 11 and top wall 12 and bottom wall 13 preferably are formed from construction materials such as stainless steel, coated mild steel, aluminum alloy, glass fiber reinforced plastic or other materials of construction as required for structural integrity, corrosion resistance and the like.

In a particular embodiment, chamber 16 is essentially a dished top and bottom welded stainless steel vessel, the dished bottom forming a concave top to chamber 17. Dished tops and bottoms may be hemispherical, ASME configuration, or other dimensions. Similarly, flat tops, bottoms, separators or combinations of dished and flat end construction may be used within the scope of this invention.

A representative vessel has a diameter 45.75 inches and a height of 95 inches. The distance between the rim of the top cover 12 and the rim of the intermediate wall 14 is 31.5 inches. The distance between the rim of the intermediate wall 14 and the rim of the bottom wall 13 is 40.5 inches. The cylindrical sidewall 11 is 3/14" stainless steel 304L. The dish-shaped covers 12, 13, 14 are 3/16" stainless steel 304L. Solids filling and withdrawal conduits 18, 19, 20, 23 are 3-inch pipe. The liquid conduits 34, 36, 40, 42 are 2-inch pipe.

An inventory 16A, 17A of activated carbon is maintained in the chambers 16, 17 respectively. A first solids loading conduit 18 is provided for introducing particulate solids into the first chamber 16A. A second solids loading conduit 19 is provided for introducing particulate solids into the chamber 17. Both conduits 18 and 19 extend through the top wall 12. The second solids loading conduit 19 also extends through the inventory 16A and through the intermediate wall 14. A first solids withdrawal conduit 20 extends through the intermediate wall 14 and side wall 11 and is provided with a valve 22 to permit removal of spent particulate solids from the chamber 16A. As shown in the drawings, a well 22 is provided in the side wall 11 to provide access to the valve 21.

A second solids withdrawal conduit 23 extends through the bottom wall 13 and is provided with a valve 24 to permit removal of spent particulate solids from the chamber 17A.

In a preferred embodiment, a cylindrical skirt 25 is secured at its upper edge 26 to the rim 27 of the bottom wall 13. Cutouts 28 are positioned in the skirt 25 to receive rectangular tubes 29 which receive the forks of a fork-lift (not shown) to facilitate moving the vessel 10.

Man-holes 30, 32 are provided in the side wall 11 to communicate respectively with the chambers 16, 17. The man-holes 30, 32 are supplied with man-hole covers 31, 33 respectively.

Fluid to be treated is introduced into the top vessel 16 through a fluid inlet conduit 34 which extends through the top wall 12. A fluid collector (which may be a fluid distributor) 35 is provided within the chamber 16 adjacent to the bottom wall 14 and is connected to a fluid withdrawal conduit 36 which extends upwardly through the top wall 12. The collector (distributor) 35 preferably is a device having a foraminous surface to permit flow of fluid but to prevent movement of particulate solids. Such collector (distributor) devices are illustrated in U.S. Pat. No. 4,379,750.

Figure 3:
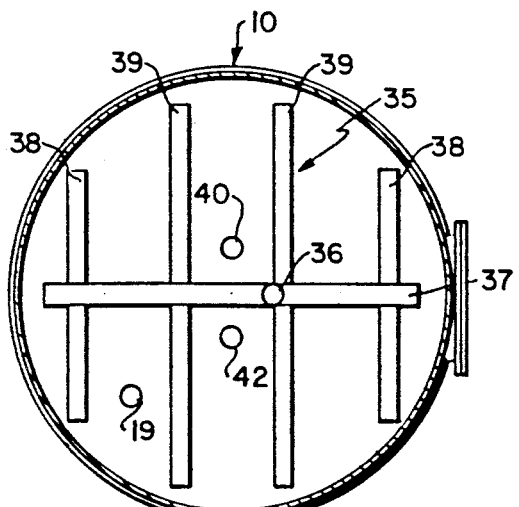
FIG. 3, 4 and 5 are cross-section views taken along the lines 3—3, 4—4 and 5—5 respectively of FIG. 1.

The collector (distributor) 35 illustrated in FIG. 3 and includes a tubular foraminous manifold 37 which connects with two short foraminous tubes 38 and two long foraminous tubes 39. The collector 35 of FIG. 3 thus is presented over substantially the entire cross-section of the vessel 10 to improve the uniformity of fluid flow through the chamber 16.

Figure 1:
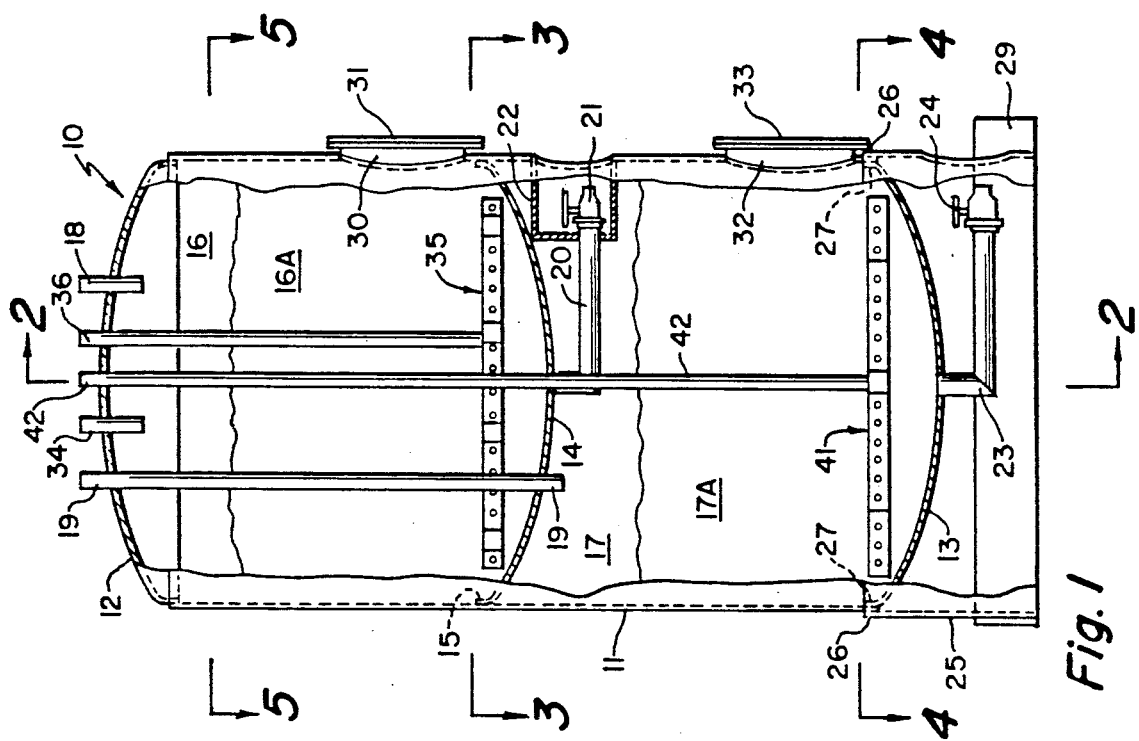
FIG. 1 is a cross-section view through a vessel of the present invention illustrating a preferred embodiment.
Figure 4:
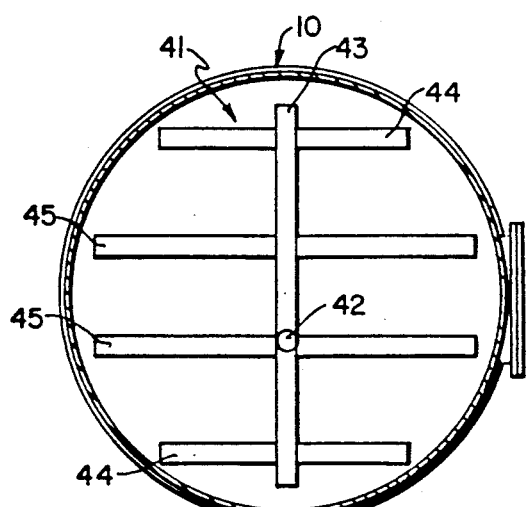

A fluid inlet conduit 40 (not seen in FIG. 1) extends through the top wall 12 and through the chamber 16 and through the intermediate wall 14 to deliver fluid to be treated into the chamber 17. A fluid collector (distributor) 41 is positioned in the chamber 17 adjacent to the bottom wall 13 and connects to a fluid withdrawal conduit 42 which extends upwardly through the chamber 17, through the intermediate wall 14, through the chamber 16 and through the top wall 12. The collector (distributor) 41 is seen more clearly in FIG. 4 as including a tubular foraminous manifold 43 and short foraminous tubes 44 and long foraminous tubes 45. The collector (distributor) 41 of FIG. 4 thus is presented over substantially the entire cross-section of the vessel 10 to improve the uniformity of fluid flow through the chamber 17.

Figure 5:
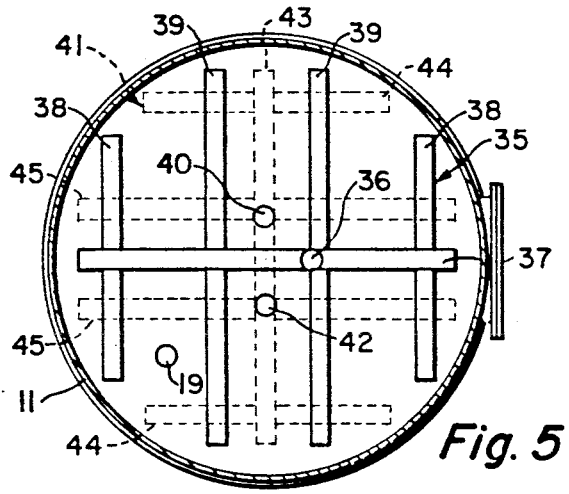

It will be observed that the collector (distributor) 35 has its tubular manifold 37 arranged perpendicularly to the tubular manifold 43 of the collector (distributor) 41. FIG. 5 illustrates the arrangement of the two-collector (distributor) elements 35, 41 and illustrates the manner in which the conduits 34, 36, 40, 42 are oriented, generally parallel to the longitudinal axis of the vessel 10. The arrangement permits the fluid inlet and withdrawal conduits 34, 36, 40, 42 to be arranged in a close array to facilitate interconnections as required.

Figure 6:
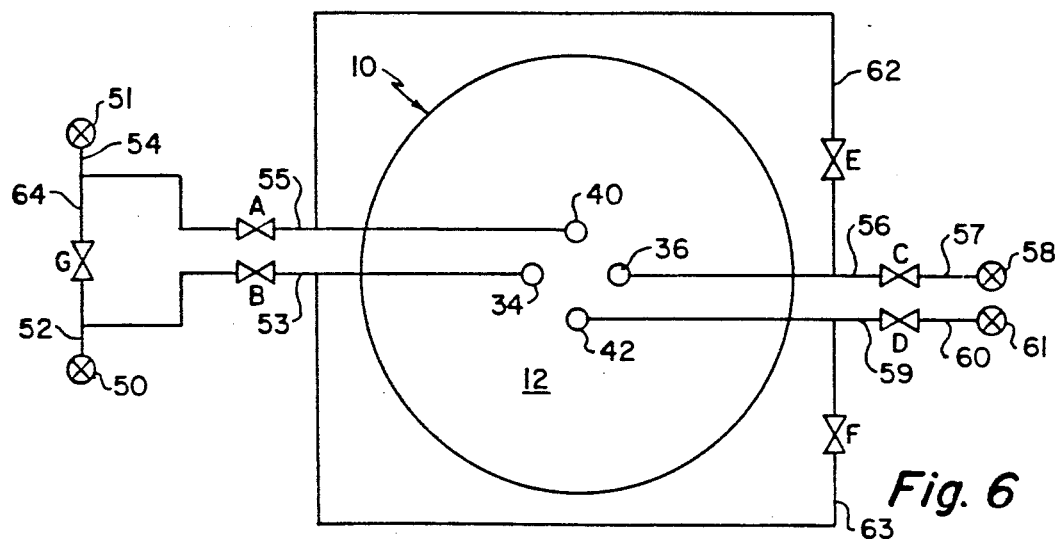
FIG. 6 is a top view of the vessel of FIG. 1.

Typical piping and valving connections for the unit are illustrated in FIG. 6 wherein a source of fluid to be treated is indicated by the symbol 50 and another source of fluid to be treated is indicated by the symbol 51. The source 50 is delivered through a conduit 52 and a conduit 53 to the first fluid inlet conduit 34. Alternative fluid to be treated is delivered from its source 51 through a conduit 54 and a conduit 55 to the second fluid inlet conduit 40. Treated fluid is recovered from the first fluid withdrawal conduit 36 through conduits 56, 57 to a distribution conduit indicated by the symbol 58. Similarly treated fluid from the second fluid withdrawal conduit 42 is delivered through conduits 59,60 to a distribution conduit 61. A serial connection conduit 62 connects the conduit 56 to the conduit 53. A serial connection conduit 63 connects the conduit 59 to the conduit 55. A valve A is in conduit 55; a valve B is in conduit 53; a valve C is in conduit 57; a valve D is in conduit 60; a valve E is in conduit 62 and a valve F is in conduit 63.

A connecting conduit 64 joins the conduits 52,54 and is provided with a valve G.

OPERATION

As indicated in FIG. 7, the vessel 10 is operated in parallel when the valves A,B,C,D are open and the valves E,F are closed. If the fluid to be treated is drawn from a common source, e.g. the source 50, then the valve G is open. If the sources 50,51 are distinct, the valve G is closed and fluid from the source 50 will be treated in the first chamber 16; fluid from the source 51 will be treated in the second chamber 17. The separate treated fluids will be collected at distributor conduits 58 (from the source 51) and 61 (from the source 51).

For serial operation, firstly in the top chamber 16 and thereafter in the bottom chamber 17, the valves B,D,E are open and the valves A,C,F,G are closed. For serial operation from the source 50, passing firstly through the bottom chamber 17 and thereafter through the top chamber 16, the valves A,C,F,G are open and the valves B,D,E are closed. Note in this mode, the fluid source 51 should be disconnected.

By providing automatic remote control on/off valves A,B,C,D,E,F,G, the operator can quickly establish the mode of operation of the vessel 10.

ALTERNATIVE EMBODIMENTS

While the vessel illustrated in FIGS. 1 through 8 is the preferred embodiment with the fluid inlet and withdrawal conduits 34,36,40,42 provided generally parallel to the longitudinal axis of the vessel 10 and extending through the top wall 12, other embodiments are considered to be within the scope of this invention. Several of these embodiments are illustrated in FIG. 9 wherein corresponding numerals indicate corresponding parts. The first fluid inlet conduit 34a and the first fluid withdrawal conduit 36a extend through the side wall 11. The second fluid inlet conduit 40a and the second fluid withdrawal conduit 42a extend through the side wall 11. The first solids inlet conduit 18a and the second solids inlet conduit 19a extend through the side wall 11. The two solids inlet conduits 18a,19a may be supplied from a common hopper 46.

One of the chambers may be an air stripper which removes organic compounds from water. The chamber will contain in part solids, e.g., rings, saddles or other column packing material. Air passes through the solids and the organics are transferred from water to the air. Thereby the correction of the water pollution has created an air pollution condition. The treating air, containing the removed organics, may be cleaned by passing the organic-containing air through activated carbon in the other chamber.

Not all organic materials can be removed by stripping. In such instances the water stream may be treated with activated carbon prior to stripping and perhaps be treated with activated carbon after stripping.

In a preferred embodiment, the stripping will be carried out in the top chamber 16 because a chamber containing packing and a water spray is lighter than a chamber filled with activated carbon and liquid. If different length/diameter ratios are indicated for the two chambers, appropriate dimensions can be provided to optimize both processes.

In the stripper, the conduit 18 which is normally a solids inlet conduit becomes an air outlet conduit; and the conduit 20 which is normally the solids withdrawal conduit becomes an air inlet conduit. The liquid inlet conduit 34 will be provided with a spray attachment (not shown) within the chamber 16 to provide the desired spray distribution.

If one chamber is used as an air stripper, the other chamber may be liquid phase activated carbon pretreatment or post treatment of the liquid stream. If no liquid treatment is required, then the other chamber may be used for final cleaning of the exhaust air from the air stripper. Of course both chambers may be used as air strippers to double the capacity of the unit.

In another embodiment, one chamber may be used as a sand filter to remove particulates from gas or liquid. A "green sand" filter may be established in one chamber to remove iron bacteria which tend to grow and accumulate in air strippers, requiring periodic cleaning of the packing with dilute hydrochloric acid.

Of course one of the chambers might contain a bed of ion-exchange resins to achieve specific removal of contaminants.

Two of the present two-chamber vessels can be combined to carry out sand filtration, "green sand" filtration, air stripping, or treatment of liquid or gas streams with activated carbon and/or ion-exchange resins.

GENERAL

While the fluid inlet conduits 34,40 and the fluid withdrawal conduits 36,42 have been illustrated as providing a top-to-bottom flow of fluid through the treatment beds 16A,17A respectively, the vessels can be operated with an upflow of fluid undergoing treatment. In this embodiment, the collectors (distributors) 35,41 may operate as distributors and the fluid conduits 36,42 correspondingly function as fluid inlet conduits with the fluid conduits 34,40 functioning as fluid withdrawal conduits.

The various openings recited in this specification have been labelled for normal usage, e.g., fluid inlet conduits 34,40; fluid withdrawal conduits 36,42; solids loading conduits 18,19; solids withdrawal conduit 20,23; and manholes 30,32. It should be apparent that most of these labelled openings could be employed for functions other than the labelled function, i.e., the fluid withdrawal conduit could be used as a solids loading conduit; the solids loading conduit could be employed as a fluid withdrawal conduit; the fluid inlet conduit could be employed as a fluid withdrawal conduit, et cetera.

OVER-ALL ADVANTAGES

The preferred embodiment of the invention includes two distinct fluid/solids treatment chambers within a common vessel. By extending the fluid inlet and fluid withdrawal conduits through the top wall as indicated in the preferred embodiment, the conduits can be easily protected from damage during storage, shipment and installation. In addition, simplified piping connections can be provided for altering the mode of operation of the vessel.

As a further alternative embodiment of the invention, a connector tubing with quick-disconnect couplings can be provided to make the necessary connections between a source of fluid 50, a distribution conduit 58 and fluid conduits 34,36,40,42.

We claim:

1. A vessel for contacting a fluid with particulate solids comprising a side wall, a top wall, a bottom wall and an intermediate wall which divides the interior of said vessel into an upper chamber and a lower chamber;

first solids loading conduit means to introduce particulate solids into said upper chamber to establish a first static bed of solids in said upper chamber; second solids loading conduit means to introduce particulate solids into said lower chamber to establish a second static bed of solids in said lower chamber;

first solids withdrawal conduit means for withdrawing particulate solids from said upper chamber; second solids withdrawal conduit means for withdrawing particulate solids from said lower chamber;

first fluid inlet conduit means for introducing fluid to be treated into the top portion of said upper chamber above the first static bed; second fluid inlet conduit means for introducing fluid to be treated into the top portion of said lower chamber above the second static bed;

first fluid withdrawal conduit means including a first fluid collector adjacent to the intermediate wall for withdrawing fluid from the bottom of said first static bed in said upper chamber; second fluid withdrawal conduit means including a second fluid collector adjacent to said bottom wall for withdrawing fluid from the bottom of said second static bed in said lower chamber.

2. The vessel of claim 1 wherein said side wall is cylindrical, said top wall and said bottom wall are dished-end closures and said intermediate wall is a dished-end closure secured at its rim to the inner surface of said side wall and positioned intermediate between said top wall and said bottom wall.

3. The vessel of claim 1 wherein said first solids withdrawal conduit means is positioned, at least in part, in said lower chamber and extends through the intermediate wall and the side wall.

4. The vessel of claim 3 wherein a well is provided in said side wall extending into said lower chamber, said well having an opening to receive said first solids withdrawal conduit, and valve means in said first solids withdrawal conduit positioned within said well.

5. The vessel of claim 1 wherein:
   (a) said first solids loading conduit means and said second solids loading conduit means; and
   (b) said first fluid inlet conduit means and said second fluid inlet conduit means; and
   (c) said first fluid withdrawal conduit means and said second fluid withdrawal conduit means extend through said top wall.

6. The vessel of claim 5 wherein connecting conduit means are provided (a) in a first combination: connecting said first fluid inlet conduit to said second fluid withdrawal conduit; and
   (b) in a second combination: connecting said first fluid withdrawal conduit to said second fluid inlet conduit;

whereby, in said first combination, fluid to be treated will pass sequentially through said lower chamber and then said upper chamber; and, in said second combination, said fluid to be treated will pass sequentially through said upper chamber and then through said lower chamber.

7. The vessel of claim 6, wherein said connecting conduit means includes valved conduit means connecting said first fluid withdrawal conduit to said second fluid inlet conduit; and also includes valved conduit means connecting said second fluid withdrawal conduit to said first fluid inlet conduit.

8. The vessel of claim 7 wherein said connecting conduit means comprise flexible connecting conduits.

9. The vessel of claim 1 wherein at least one said fluid collector has multiple openings which permit flow of fluid therethrough and resist flow of said particulate solids therethrough.

10. The vessel of claim 1 wherein each of the said chambers is substantially unobstructed to promote substantially uniform flow of fluid downwardly through each said static bed.

11. The vessel of claim 1 wherein said first fluid inlet conduit means extends through said top wall and communicates with said upper chamber; and said second fluid inlet conduit means extends through said top wall, through said upper chamber and through said intermediate wall to communicate with said lower chamber.

12. The vessel of claim 1 wherein said first solids loading conduit means extends through said top wall and communicates with said upper chamber; and wherein said second solids loading conduit means extends through said top wall, through said upper chamber and through said intermediate wall to communicate with said lower chamber.

13. The vessel of claim 1 wherein said first fluid withdrawal conduit means includes a conduit extending vertically upwardly through said top wall.

14. The vessel of claim 1 wherein said second fluid withdrawal conduit means includes a conduit extending from said second fluid collector vertically upwardly through said lower chamber, through said intermediate wall, through said upper chamber and through said top wall.

15. The vessel of claim 1 wherein said first fluid withdrawal conduit means includes a conduit extending from said first fluid collector vertically upwardly through said top wall; and wherein said second fluid withdrawal conduit means includes a conduit extending from said second fluid collector vertically upwardly through said lower chamber, through said intermediate wall, through said upper chamber and through said top wall.

16. The vessel of claim 15 including a connecting conduit means outside said vessel having one end communicating with said first fluid withdrawal conduit and having the other end communicating with said second fluid inlet conduit means whereby fluids undergoing treatment pass sequentially through said upper chamber and then through said lower chamber.

* * * * *